Figure 1:
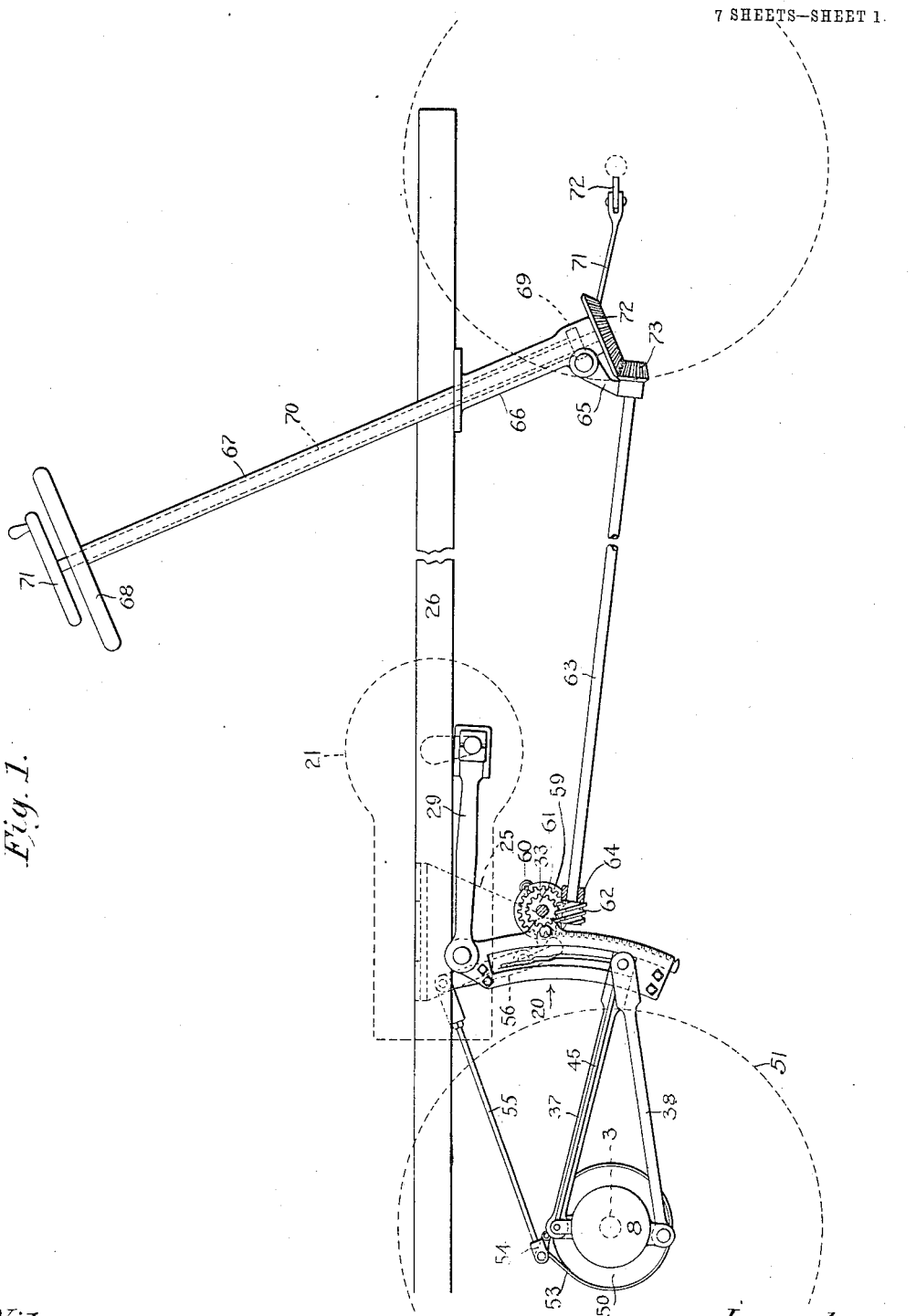

No. 831,856. PATENTED SEPT. 25, 1906.
G. T. HACKLEY.
DRIVING AND CONTROLLING GEAR.
APPLICATION FILED SEPT. 6, 1905.
7 SHEETS—SHEET 2.
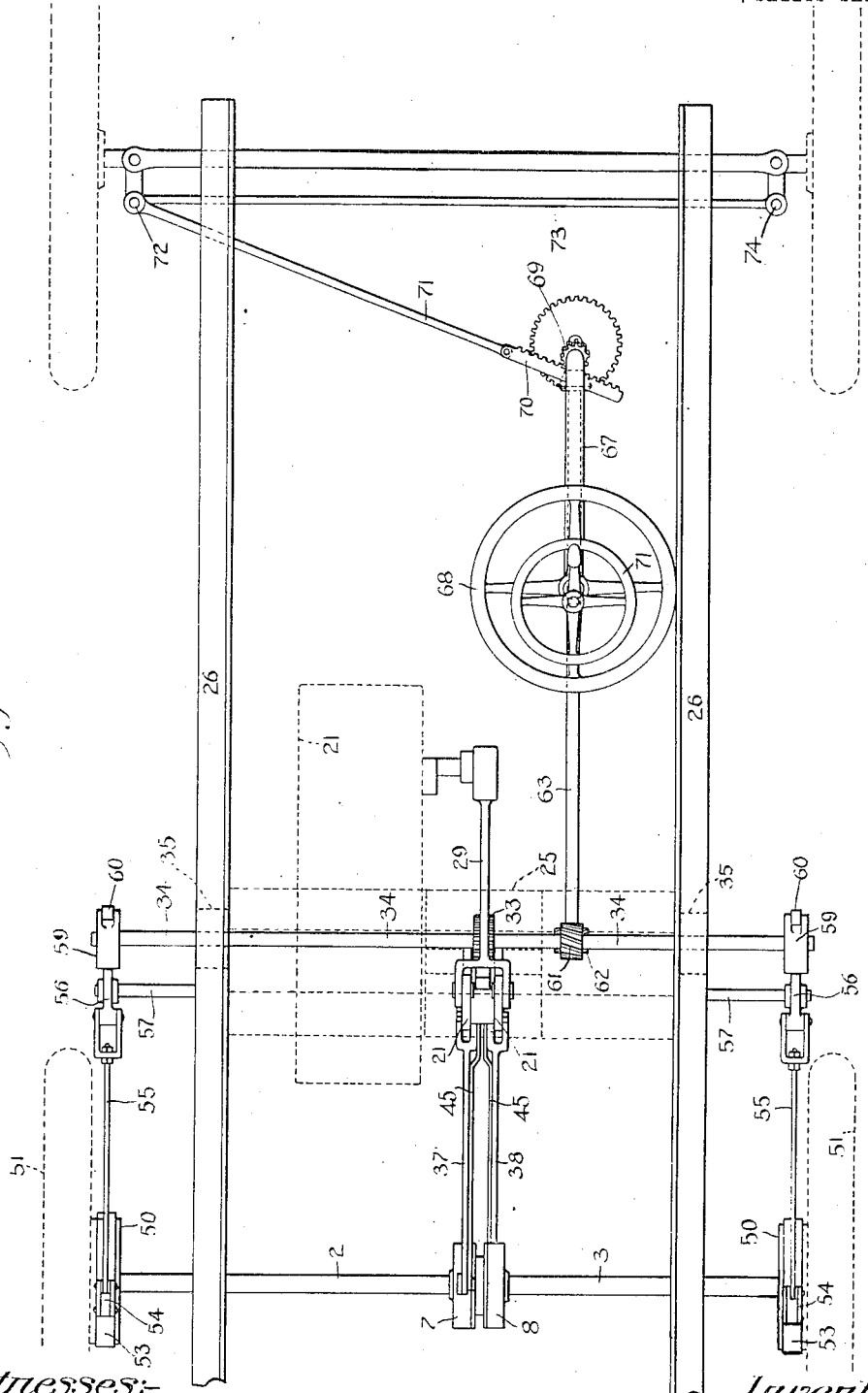
Fig. 2.
Witnesses:
Frank L. A. Graham
[signature]
Inventor;
George T. Hackley.
by 
atty.

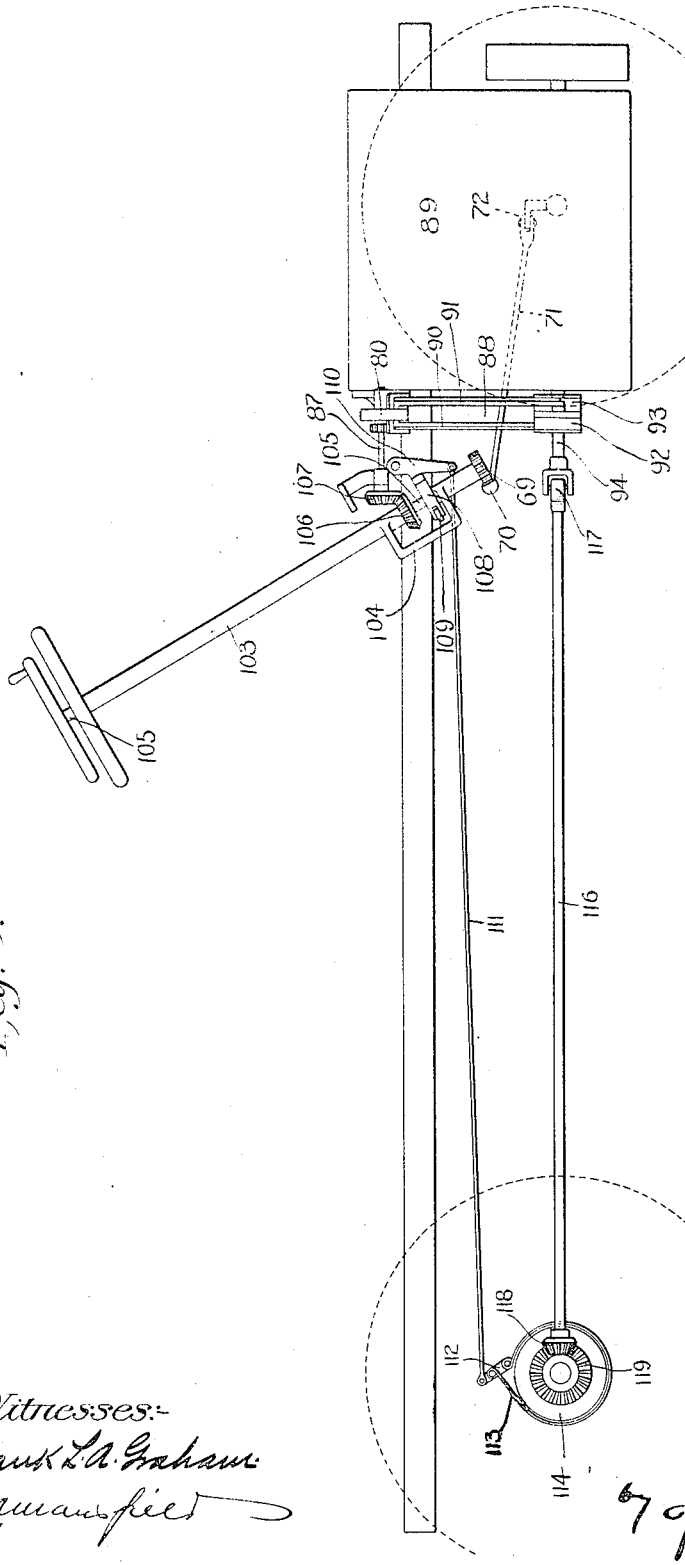

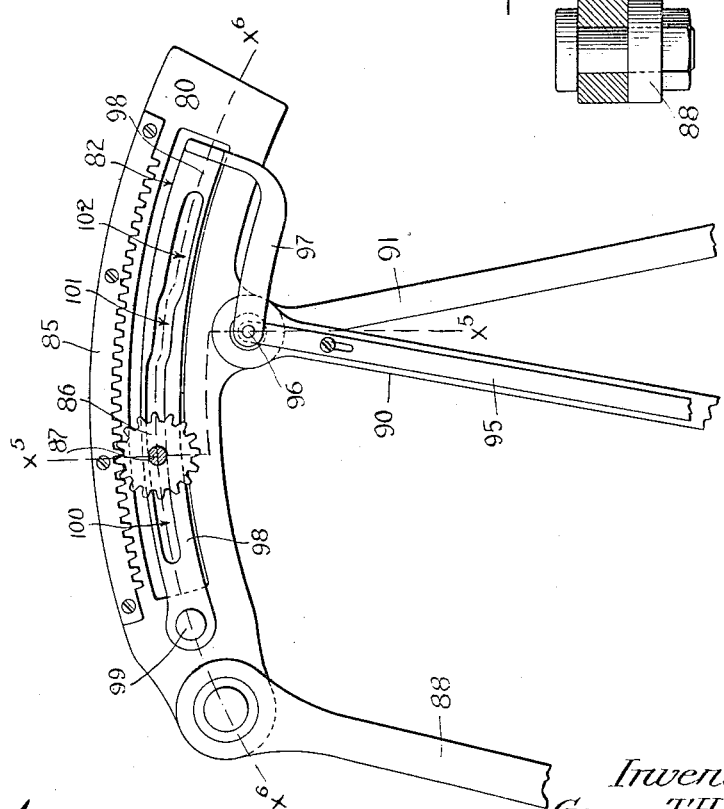

No. 831,856. PATENTED SEPT. 25, 1906.
G. T. HACKLEY.
DRIVING AND CONTROLLING GEAR.
APPLICATION FILED SEPT. 6, 1905.
7 SHEETS—SHEET 5.
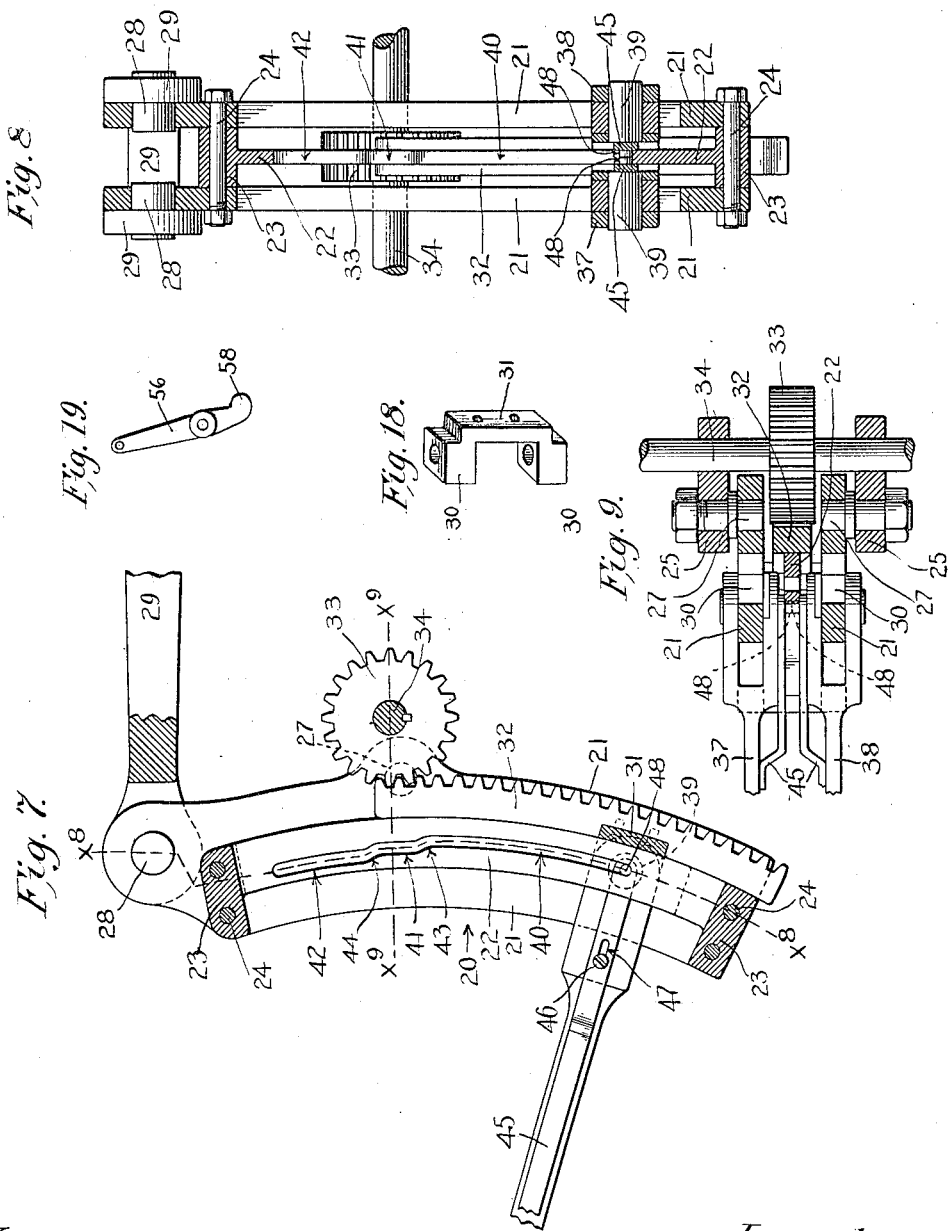
Witnesses:-
Frank L. A. Graham.
[signature]
Inventor;
George T. Hackley.
by
Townsend & Lyon Hackley & Knight
atty.

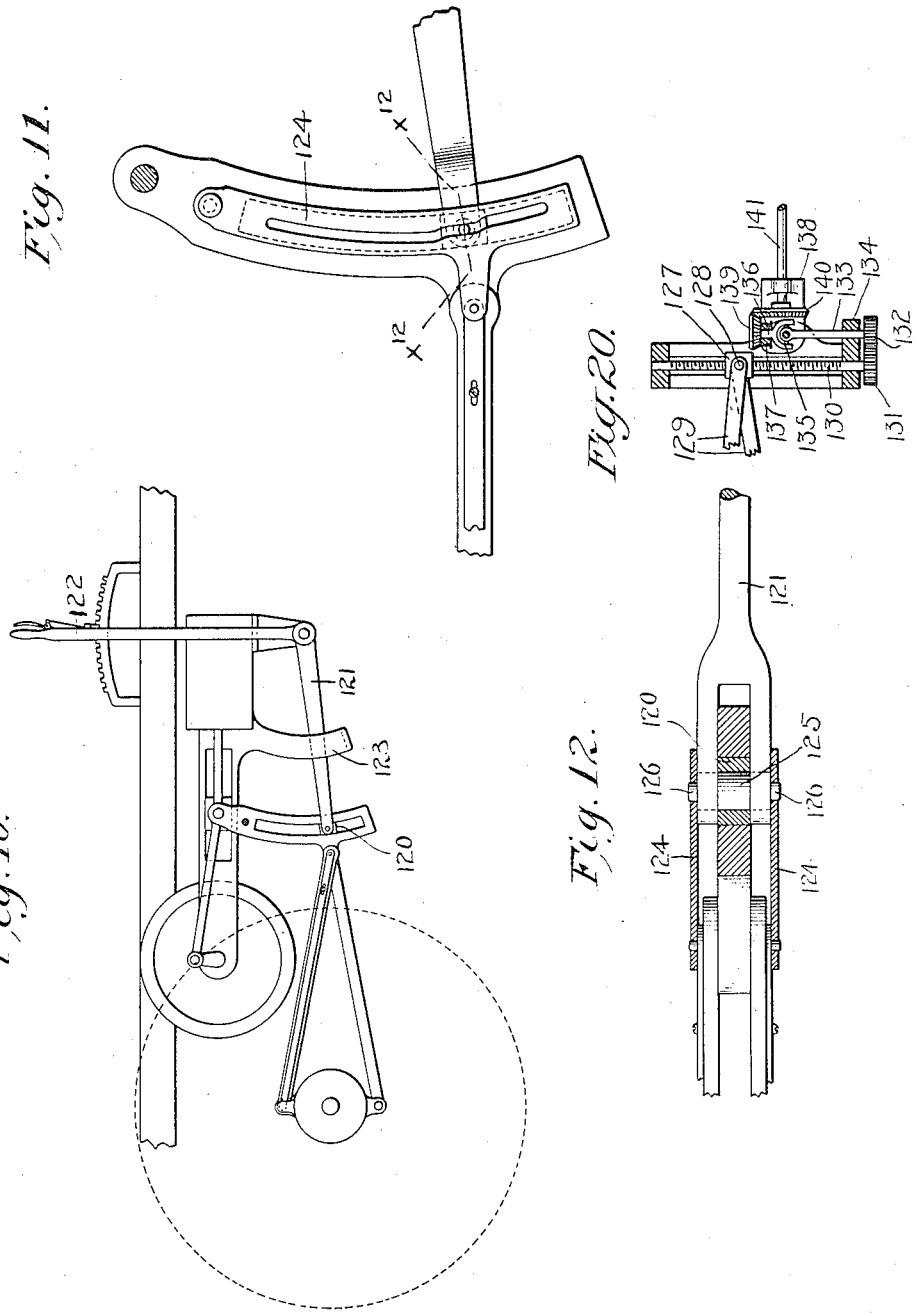

No. 831,856. PATENTED SEPT. 25, 1906.
G. T. HACKLEY.
DRIVING AND CONTROLLING GEAR.
APPLICATION FILED SEPT. 6, 1905.

7 SHEETS—SHEET 7.

Witnesses:
Frank L. A. Graham
[signature]

Inventor:
George T. Hackley
by Townsend Byout Hackley & Knight
attys

UNITED STATES PATENT OFFICE.

GEORGE T. HACKLEY, OF LOS ANGELES, CALIFORNIA, ASSIGNOR TO DIRECT DRIVE POWER TRANSMISSION COMPANY, OF LOS ANGELES, CALIFORNIA, A CORPORATION OF CALIFORNIA.

DRIVING AND CONTROLLING GEAR.

No. 831,856.　　　Specification of Letters Patent.　　　Patented Sept. 25, 1906.

Application filed September 6, 1905. Serial No. 277,170.

*To all whom it may concern:*

Be it known that I, GEORGE T. HACKLEY, a citizen of the United States, residing at Los Angeles, in the county of Los Angeles and State of California, have invented a new and useful Driving and Controlling Gear, of which the following is a specification.

This invention relates to driving and controlling gears, which is particularly adapted for use on automobiles; and the main object of the invention is to provide means for securing any desired speed ratio between the motor and driving-wheels, to propel the vehicle in either direction, or to allow the vehicle to stand still or to coast.

Another object is to provide means for automatically applying the brake before a reversal of power is effected in either direction.

Another object is to effect entire control of the foregoing functions by a single manually-operated device, such as a wheel or a lever, a further object being to mount the controlling-wheel or other device near the steering-wheel, preferably above the steering-wheel and concentric therewith in a position most convenient to the chauffeur.

The manual controlling device preferably comprises a wheel or a crank which may be turned through substantially a complete circle, and a further object is to arrange for the respective various controlling functions of the wheel or crank being active respectively within distinct arcs of the cycle of the wheel or crank, the arrangement preferably being such that with the wheel at one extreme—say full speed ahead—by turning the wheel back through a certain arc the speed is reduced accordingly. When the wheel is turned through the next arc, the vehicle either stands still or coasts. When the wheel is turned through the next arc, the brake is applied, the power being removed from the driving-wheel. The turning of the wheel through the next arc releases the brake and the machine either stands still or may coast. Continued turning of the wheel in the same direction into the next arc applies power to the driving-wheels and rotates them reversely to back the motor-car, the speed being very slow as the arc is first entered and being gradually increased as the arc is traversed. By turning the wheel back through the arcs the foregoing functions are secured in reverse sequence and reverse ratio of speed change. Thus without stopping the engine or regulating its speed in any manner by a simple manipulation of the wheel an infinite number of rates of speed in either direction or coasting of the vehicle or stoppage without applying brake or stoppage with application of brake may be attained.

The brake may be applied quickly and hard by setting the wheel at the brake-point and holding the wheel on the brake-point, or the brake can be applied gradually by turning the wheel to and from the brake-point from either side of the point or by swinging the wheel back and forth across the brake-point and dwelling on the point more or less, as desired, in a manner similar to the application of air-brakes on a locomotive.

The advantages of the wheel control are obvious and manifold. Its manipulation is extremely simple, and confusion is impossible, as the functions arise in an orderly and natural sequence and it is impossible for one function to interfere with another. For example, before the vehicle can be reversed the wheel must of necessity be turned across the stoppage and brake arcs, so that if under headway its speed is automatically checked or it is stopped, or after backing up before going ahead the wheel must be turned back through the stoppage and brake arcs, and though the brake is applied automatically in these cases it may also be applied at any time and in any degree, it obviously being impossible to apply the brake while the power is on the driving-wheels.

While the foregoing arrangement secures infinite variety of speed changes and other functions, the range of speed of the vehicle is greatest with engines having a fast speed. With this controlling mechanism with the engine running at maximum speed all variations of that speed as imparted to the vehicle to propel it in either direction are attained without the necessity of changing the engine speed. Thus flexibility of engine speed is not essential, as the flexibility of vehicle speed with this invention is infinite. It is thereby possible to get the greatest power from an engine by running it at high speed and regulating the vehicle speed by the controlling-gear.

Many other advantages of the invention will appear from the following description.

Figure 13:
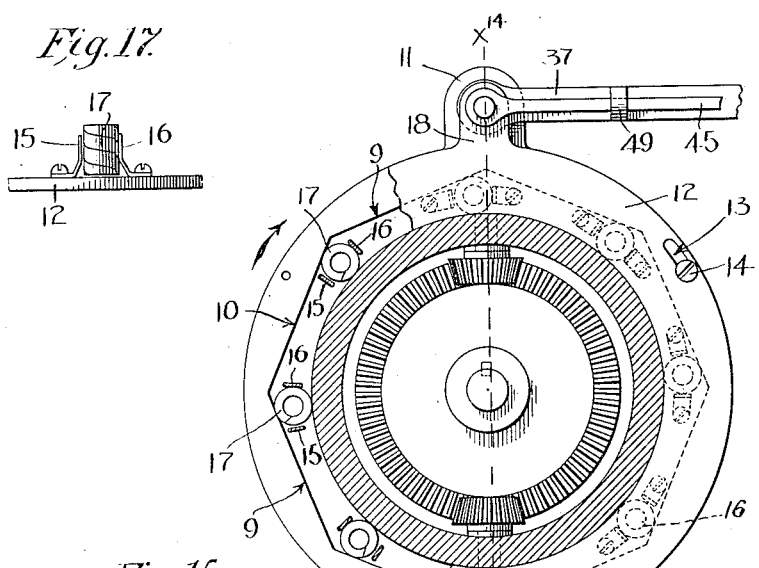
Figure 17:
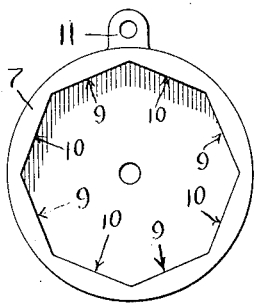
Figures 14, 15:
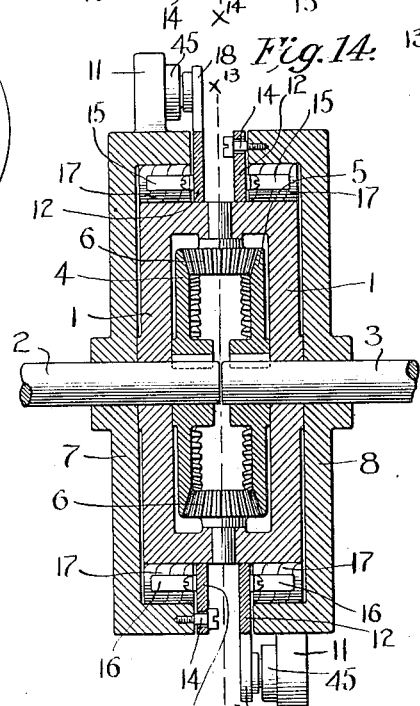
Figure 16:
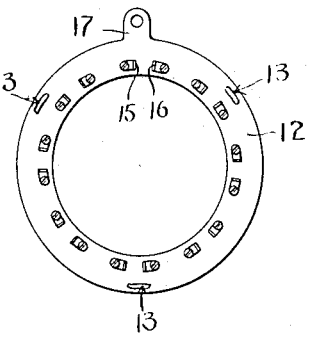

The accompanying drawings illustrate the invention, and, referring thereto, Figure 1 is a side elevation of one form of the invention, the wheels and motor of the vehicle being shown by dotted lines. Fig. 2 is a plan view of the mechanism shown in Fig. 1. Fig. 3 is a side elevation of another form. Fig. 4 is a detail view, in front elevation, enlarged, of the link used in the form shown in Fig. 3, part of the radius-rods and connecting-rod being broken away. Fig. 5 is a section on line $X^5 X^5$ of Fig. 4. Fig. 6 is a section on line $X^6 X^6$ of Fig. 5. Fig. 7 is a vertical sectional view, partly in elevation, of the double link used in the form shown in Fig. 1 with nearest radius-rod broken away. Fig. 8 is a section on line $X^8 X^8$, Fig. 7. Fig. 9 is a section on line $X^9 X^9$, Fig. 7, showing also the supporting-brackets for the link. Fig. 10 is a side elevation of another form of driving and controlling gear in which the fulcrum of the link is shiftable. Fig. 11 is an enlarged side elevation of the link, showing details. Fig. 12 is a section on line $X^{12} X^{12}$ of Fig. 11. Fig. 13 is a side elevation, partly in section, on line $X^{13} X^{13}$ of Fig. 14, showing the power-transmitter with part of the spring-plate broken away. Fig. 14 is a section on line $X^{14} X^{14}$ of Fig. 13. Fig. 15 is a side elevation in detail, on a reduced scale, of the oscillatory gripper. Fig. 16 is a side elevation in detail, on a reduced scale, of the oscillatory spring-plate. Fig. 17 is a side view, enlarged, of a portion of the spring-plate, showing detail of springs with a gripping-roller in place between them. Fig. 18 is a perspective of the link-block. Fig. 19 is a detail in side elevation of the brake-lever. Fig. 20 is a section through another form of link, showing the link-block and gearing in side elevation.

When the oscillatory device or power-transmitter for rotating the driven element is applied to the rear axle of the vehicle, as in the forms shown in Figs. 1 and 10, the oscillatory device is preferably combined with the differential gear. When the oscillatory device is used with the bevel-gear drive, as in the form shown in Fig. 3, it may be applied directly to the propeller-shaft. The oscillatory power-transmitter is well known and various designs may be employed; but in Figs. 13 to 17 is illustrated one form which is adapted to transmit power in either direction and to allow coasting. This oscillatory power-transmitter is shown combined with a differential gear of the common bevel-gear type comprising a hollow casing 1, which is loosely mounted on two members 2 and 3 of the double rear axle. Within the casing 1 is a pair of bevel-gears 4 and 5, the former being rigidly mounted on the member 2 and the latter being rigidly mounted on the member 3. Journaled in the casing 1 at opposite points are bevel-pinions 6, which mesh with the gears 4 and 5. Loosely mounted on the members 2 and 3 are oscillatory grippers 7 and 8, each of which is cupped to form two sets of internal alternating gripping-surfaces 9 and 10. Each oscillatory gripper has an ear 11. Carried bodily by each oscillatory gripper is an annular spring-plate 12. Each spring-plate rocks with its oscillatory gripper, but is adjustable revolubly on its oscillatory gripper, being provided with concentric slots 13, through which studs 14 project, the studs 14 being screwed to the oscillatory gripper.

Each spring-plate is provided with several pairs of flat springs 15 and 16, which project into the cupped oscillatory gripper and lie close to the gripping-surfaces 9 and 10. Positioned between each pair of springs are rollers 17, which may be of coiled steel, as shown, and which are adapted to bear against the outer surface of the casing 1 and the internal gripping-surfaces 9 and 10 or to lie out of contact with either gripping-face 9 and 10, according to the position in which the spring-plate 12 is adjusted on the oscillatory gripper. Each spring-plate has an ear 18, by means of which it may be adjusted.

When the spring-plate is shifted to one extreme on its oscillatory gripper, the springs 16 force the rollers 17 against the gripping-faces 10, as in Fig. 13. When the spring-plate is shifted to the other extreme, the springs 15 force the rollers 17 against the gripping-faces 9, while when the spring-plate is adjusted to mid-position the springs 15 and 16 hold the rollers 17 substantially midway between the gripping-faces 9 and 10. The springs 15 and 16 are preferably spaced apart a little wider than the diameter of the rollers to prevent unnecessary friction.

In operation assuming the spring-plate to be shifted or adjusted as in Fig. 13, with the rollers in contact with gripping-faces 10, when the oscillatory gripper rocks in the direction of the arrow the rollers 17 are tightly wedged between the faces 10 and the outside face of the casing 1, so that the latter is moved in the same direction therewith, and when the oscillatory gripper rocks back, carrying with it the spring-plate 12, the rollers 17 ride freely back on the casing 1, so that when both oscillatory grippers are simultaneously rocked in opposite directions the casing 1 is continuously rotated in a forward direction, thus driving the axle members 2 and 3. If the spring-plates be shifted to the opposite position, the operative relation of the oscillator is reversed. It is obvious that the rollers 17 will then become effective on the back stroke and ride free on the forward stroke, so that the casing 1 will then be rotated backward, while if the spring-plate is shifted to mid-position the rollers will ride freely over the casing 1 when the oscillatory gripper rocks and will not impart power to the casing 1. This mid-position of the spring-plates is the coasting position and allows free movement of the casing 1 irrespective of whether the oscillatory grippers are operating or not. Thus when the spring-plates are shifted into one extreme position the oscillatory power-transmitters as they rock back and forth will rotate the differential drum in one direction and when the spring-plates are shifted into their extreme opposite position the oscillations of the oscillatory power-transmitters will rotate the differential drum in the opposite direction. Hence the shifting of the spring-plates from either extreme to the other reverses the operative relation of the power-transmitters to the differential drum and drives the latter in a direction corresponding to the relation of the spring-plate. Therefore in the claims I use the term "reversing the operative relation of the oscillatory device" to specify adjusting the oscillatory device to cause it to drive the driven element in an opposite direction.

Referring now to the embodiment shown in Figs. 1, 2, 7, 8, and 9, a double link 20 comprises slotted segmental pieces 21, which are spaced apart, (see Figs. 8 and 9,) and lying midway between the plates 21 is a shift-plate 22, which has enlarged ends 23, to which the plates 21 are fastened by bolts 24. Brackets 25 hang from the vehicle-frame 26, and trunnions 27 are rigidly fastened to the brackets, as shown in Fig. 9, the trunnions 27 pivotally supporting the link 20. The upper end of the link carries wrist-pins 28, to which the forked end of a connecting-rod 29 is attached, the other end of the connecting-rod being attached to the crank of the engine 21. Slidably mounted in the slotted members of the link are link-blocks 30, which are united by an offset bridge 31, Fig. 18, the link-blocks and bridge being preferably integral, and as they form practically one element for convenience of description they will hereinafter be referred to as the "link-block." A segmental rack 32 lies between the two plates of the link and is notched to receive the bridge 31 of the link-block, the bridge being screwed to the rack 32. The rear edge of the rack 32 rests against the front edge of the curved shift-plate 22, so that it is guided and confined to a curved path when moved up or down by a pinion 33, which meshes therewith, the pinion being rigidly mounted on a cross-shaft 34, journaled in the brackets 25. Brackets 35, Fig. 2, which depend from the frame 26, serve to further support the cross-shaft. The brackets 35 are removed from Fig. 1 to secure clearness of the view. Radius-rods 37 and 38 each have a forked end which straddles a member of the double link and is pivoted to a member 30 of the link-block by a pin 39. The inner ends of the pins 39 are flush with the inner faces of the forks of the radius-rods 37 and 38. The rear end of the radius-rod 37 is connected to the upper ear 11 of the oscillatory gripper 7, and the rear end of the radius-rod 38 is connected to the lower ear 11 of the oscillatory gripper 8. The shift-plate 22 has a tortuous slot with three concentric sections 40 41 42, Fig. 8, with abrupt shoulders 43 and 44. Carried by the radius-rods 37 and 38 are shift-rods 45, each of which is adjustably secured by studs 46, which project through slots 47 in each shift-rod. The forward end of each shift-rod is offset, as shown in Figs. 2 and 9, so that its offset end lies close against the fork of the radius-rod, and the forward offset end of each shift-rod has a stud 48, which projects into the tortuous slot of the shift-plate 22. The studs 48 are both in line and nearly meet at the center of the shift-plate, Fig. 8. The rear ends of the shift-rods 45 may be guided by straps 49, attached to the radius-rods, Fig. 13, and the shift-rod on the radius-rod 37 is connected to the ear 17 of the spring-plate 12 on the oscillatory gripper 7, while the shift-rod on the radius-rod 38 is connected to the ear of the spring-plate on the oscillatory gripper 8. Brake-drums 50 may be attached to the driving-wheels 51, as shown in Figs. 1 and 2, and around each brake-drum is a brake-strap 53, which may be tightened or relaxed by a lever device 54. The lever devices 54 are connected by brake-rods 55 with brake-levers 56, pivoted to shafts 57. The lower end of each brake-lever has a nose 58, Figs. 1 and 19. Rigidly mounted on the ends of the cross-shaft 34 are disks 59, each having a small roller 60. When the brake-bands 53 are relaxed, the upper ends of the brake-levers 56 are tilted back so that their noses 58 rest against the disks 59. When the cross-shaft is turned around, the small rollers 60 ride over the noses 58 and tilt the brake-levers, thereby applying the brakes. The noses 58 are preferably formed with blunt noses, so that when the cross-shaft is turned to a certain position the small rollers 60 will rest against the blunt noses until moved off by the turning of the cross-shaft. The blunt noses also cause a dwell between the setting and releasing of the brakes when the cross-shaft is turned around without stopping at the brake-point—that is, the point in its revolution at which the brake is applied—whereby the brake is held set during an appreciable though short amount of rotation of the cross-shaft. A spiral gear 61 is rigidly mounted on the cross-shaft, and meshing therewith is another spiral gear 62, mounted on a controller-shaft 63, the rear end of which is journaled in a bracket 64. The forward end of the controller-shaft 63 is journaled in a bracket 65, which forms part of the steering-column bracket 66. Mounted in the bracket 66 is a hollow steering-column 67, having a steering-wheel 68 on its upper end and having a pinion 69 on its lower end, which meshes with a rack 70, the rack 70 being connected by a rod 71 with one steering-knuckle 72, which is connected by a cross-rod 73 with the opposite steering-knuckle 74. Passing through the hollow steering-column 67 is a controller-column 70, on the upper end of which is a controller 71. The lower end of the controller-column 70 carries a bevel-gear 72, which meshes with a bevel-pinion 73 on the end of the controller-shaft 63. The pinion 73, gear 72, and spiral gears 61 and 62 should be preferably proportioned so that one complete revolution of the controller will give one complete revolution of the cross-shaft 34 and gear 33, and the gear 33 should preferably be so proportioned that one revolution of it will, through the medium of the rack 32, move the link-block 30 the length of the slot in the link.

In operation with the engine running the link is rocked by the connecting-rod 29, and if the controller is so set that the link-block 30 lies at the extreme lower end of the link the radius-rods 37 and 38 will be reciprocated through their maximum stroke and the oscillatory grippers will be rocked through their maximum stroke accordingly, and as with the link-block in this position the studs 48 lie in the slotted section 40 the shift-rods 45 are held in their forward adjustment, and the spring-plates 12 are held in their forward adjustment, so that the rollers 17 make contact with the faces 9 of the oscillatory grippers 7, and the differential gear-casing 1 is thereby continuously rotated forward, one oscillatory gripper actuating it forward, while the other oscillatory gripper is recovering, each oscillatory gripper acting alternately, so that a continuous forward movement of the casing 1 is secured. If now the controller 71 is turned to raise the link-block toward the center of the link, the stroke of the radius-rods and the arc of oscillation of the power-transmitters will be lessened accordingly and the speed of the vehicle correspondingly reduced, while by turning the controller still farther the link-block may be brought so near the fulcrum of the link that no perceptible reciprocation of the radius-rods results, and hence no movement of the oscillatory power-transmitters and movement of the vehicle. When the link-block is at any point between the shoulders 43 and 44, there is no reciprocation of the radius-rods. By turning the controller farther to bring the link-block nearer the fulcrum the studs 48 enter the slotted section 41, which slips the shift-rods 45 backward somewhat and brings the spring-plates 12 into mid-position, thereby freeing the oscillatory power-transmitters and allowing coasting, as before pointed out. By turning the controller still farther the link-block is moved up the link still nearer to the fulcrum and when near the dead-center the small rollers 60 tilt the brake-rods, so that when the link-block is actually on the dead-center the brakes are hard on, and the vehicle is accordingly slowed down, and the chauffeur should preferably dwell with the controller on the brake-point if he intends to reverse. The vehicle is thus stopped, although the engine continues to run. By turning the controller still farther in the same direction the link-block is raised above the dead-center, and the rollers 60 roll off from the brake-levers 56, thereby releasing the brakes, and the second coasting-point in the controller position is reached. By turning the controller still farther the studs 48 move into the slotted section 42, thereby reversing the oscillatory power-transmitters, and further movement of the controller raises the link-block, so that very slow backward movement of the vehicle is at first secured, which movement is gradually increased as the controller is moved farther to raise the link-block above the fulcrum. Thus when the controller has completed its revolution the vehicle is propelled backward at full speed, which obviously should be much less than full speed ahead, and to that end the slot in the link only extends a short distance above the link-fulcrum, as shown. By moving the controller in the opposite direction the functions just described are carried out in reverse sequence. The backward speed is gradually decreased. The brake is applied, and forward movement is secured, at first slow, but gradually increasing as the controller is moved around to the limit giving full speed ahead. In this manner the control of the vehicle may be accomplished by manipulation of the controller, and it is obvious that it is impossible for any of the functions to conflict, but that they all follow each other in natural and orderly manner, the brake being automatically applied at the proper point and automatically released at the proper point, complete harmony of the various functions being attained. It is thus possible to start the vehicle very slowly at first and to increase its speed gradually as desired. Obviously without altering the engine speed any speed desired in either direction may readily be obtained for the vehicle. The number of obtainable speeds is infinite within the range provided, and fine gradations of speed are easily obtained, as a considerable movement relatively has to be given to the controller compared to the adjusting movement thereby given to the link-block.

Owing to the convenient position of the controller immediately above the steering-wheel, manipulation of the vehicle is greatly facilitated.

Obviously the brake cannot be applied without the power being first automatically rendered *nil*, and the vehicle cannot be reversed without first rendering the propelling power *nil* and applying the brake to stop the vehicle. While if the controller is quickly moved across the brake-point the brake may not be applied long enough to stop the vehicle when under considerable headway, still the speed is checked somewhat, so that the shock of sudden reversal of the vehicle is softened considerably. Under ordinary conditions of running the chauffeur will hold the controller on the brake-point long enough to stop the vehicle before reversing and will not throw on the reverse suddenly except in emergencies. In ordinarily bringing the vehicle to a stop the controller may be swung back and forth across the brake-point in a manner similar to the application of airbrakes on a locomotive, which will prevent skidding of the wheels by gradually stopping the vehicle without locking the wheels, or the controller may be turned onto or off from the brake-point from either side, thus accomplishing the same result.

No great care is required in applying the brake, as the controller can be freely swung back and forth, as described, or it may be held stationary on the brake-point to hold the brakes hard if a quicker stop is needed.

Figs. 3 to 6 show the application of the link to the front end of the vehicle, which form is especially desirable for heavy vehicles of the touring-car and other types employing the bevel-gear drive. In this form a single link 80 is employed, which is supported by a fulcrum-block 81, which lies within the slot 82 of the link and which is pivotally mounted on a hollow shouldered stud 83, forming part of a stationary bracket 84. A curved rack 85 the pitch-line of which is concentric with the link is screwed to the link, forming practically a part thereof and meshes with a pinion 86, carried on a shaft 87, which is journaled in the hollow stud 83. One end of the link is attached to a connecting-rod 88, which is driven by the engine 89. Radius-rods 90 and 91 are pivoted to the link by a common pin 92, Fig. 5, and are connected with oscillatory power-transmitters 92 and 93 similar to those previously described, except that instead of being mounted on the differential-gear casing they are directly mounted on a shaft 94. Shift-rods 95, adjustably carried by the radius-rods, connect with the oscillatory power-transmitters, as previously described, and each has a stud 96, Figs. 5 and 6, which engages a fork 97, carried by a shift-bar 98, which is pivoted at 99 to the link 80. The shift-bar 98 has a tortuous slot with sections 100 101 102, through which slot the shaft 87 passes, Figs. 5 and 6. The hollow steering-column 103 has an opening bridged by a bracket 104, while the lower end of the steering-column is connected by gear 69, rack 70, and rod 71 with the steering-knuckle 72, as in the previous form. Within the steering-column is the controller-column 105, carrying a bevel-gear 106, which meshes with a bevel-gear 107 on the shaft 87. Thus by turning the controller the described gearing will rotate the shaft 87 and turn the gear 86, thereby, through the medium of the rack 85, shifting the link along the fulcrum-block 81. By this means the relative positions of the radius-rods and link-fulcrum may be varied, as desired. Rigidly attached to the controller-column 105 is a disk 108, carrying a small roller 109, which when the controller turns the disk is adapted to swing a lever 110, which lever, being connected by a brake-rod 111 with a lever device 112, is adapted to tighten or relax a brake-band 113, which works against a brake-drum 114, which may be the casing of the differential gear, which latter is shown in detail in Fig. 14. A shaft 116 is connected at its front end by a universal joint 117 with the shaft 94, while its rear end has a bevel-pinion 118, meshing with a bevel-gear 119 on the differential-gear casing. In operation the link is rocked by the connecting-rod 88 and through the radius-rods 90 and 91 actuates the oscillatory power-transmitters, thereby driving the shaft 116 and the vehicle. As the link rocks it will also be incidentally given a slight slipping movement over the fulcrum-block as the rack 85 rocks around the set-gear 86. Obviously the speed of the vehicle will depend on the position which the link has relatively to the fulcrum. The link is shifted into the desired position by turning the controller. When the link is in the position shown in Fig. 4, the shift-plate 98 holds the shift-rods in their highest adjustment and the oscillatory power-transmitters move the vehicle ahead. When the link is shifted and the shift-plate drawn with it, so that the shaft 87 lies in the slotted section 101, the shift-plate is tilted slightly on the link, which through the shift-rods puts the oscillatory power-transmitters in free or mid position, while when the link is shifted farther, so that the shaft 87 lies within the slotted section 102, the shift-plate is tilted to its lowest position on the link and through the shift-rods reverses the oscillatory power-transmitters. All of the functions previously described in connection with the first form are carried out by this form and need not be repeated.

Figs. 10, 11, and 12 show another form in which the fulcrum 120 of the link is carried on the end of a lever 121, which is controlled by a hand-lever 122, the lever 121 being steadied by a slotted guide 123. Pivoted to the link is a pair of shift-plates 124, each shift-plate being pivotally connected to its respective radius-rod. The pin 125, which connects the lever 121 with the link-block 120, has studs 126, which slide through the tortuous slot in the shift-plates when the link-block is moved up or down, and the shift-plates are thus adjusted on the link into either of their three positions, according to the position of the link-block, and the vehicle is thus either driven forward or backward or is not actuated by power from the engine. In this form as the link is connected to the cross-head of the engine its upper end has a rectilineal movement which slides the link slightly on the link-block as it rocks.

While several forms of this invention have been shown, all of which are embraced by the claims, other constructions might be employed without departing from the spirit of the invention.

Fig. 20 shows another form of gearing for adjusting the radius-rods on the link. The link-block 127 has trunnions 128, to which are connected the radius-rods 129. The link-block is bored and threaded vertically to receive a screw 130, which is rotatably mounted on the link. The lower end of the screw 130 has a gear 131, which meshes with a gear 132 on a shaft 133, mounted in brackets 134 on the link. The upper end of the shaft 133 is connected by a universal joint 135 with a short shaft 136, mounted in a stationary bearing 137 on the frame 138. The shaft 136 has a bevel-gear 139, which meshes with a bevel-gear 140 on the controller-shaft 141, and by turning the latter the screw 130 is revolved to raise or lower the link-block 127. The universal joint 135 is situated at the fulcrum of the link between the link-trunnions, and thus allows the shaft 133 to freely rock with the link.

What I claim is—

1. A driven element, an oscillatory device for rotating the driven element, means for reversing the operative relation of the oscillatory device, means for varying the stroke of the oscillatory device, and a single device for controlling the last two means.

2. A driven element, an oscillatory device for rotating the driven element, a brake, means for varying the stroke of the oscillatory device, and a single device for controlling the brake and said varying means.

3. A driven element, an oscillatory device for rotating the driven element, a brake, means for varying the stroke of the oscillatory device, means for reversing the operative relation of the oscillatory device, and a single device for controlling the brake and the varying means.

4. A driven element, an oscillatory device for rotating the driven element, means for reversing the operative relation of the oscillatory device, a brake, and a single device for controlling the reversing means and brake.

5. A driven element, an oscillatory device for rotating the driven element, means for reversing the operative relation of the oscillatory device, a brake, and automatic means for applying the brake before the oscillatory device is reversed.

6. A driven element, an oscillatory device for rotating the driven element, means for reversing the operative relation of the oscillatory device, a brake, and automatic means for applying the brake and then releasing the brake before the oscillatory device is reversed.

7. A driven element, an oscillatory device for rotating the driven element, means for reversing the operative relation of the oscillatory device, means for operating the oscillatory device, and means for automatically stopping the operating means and thereby the oscillatory device before said oscillatory device is reversed.

8. A driven element, an oscillatory device for rotating the driven element, means for reversing the operative relation of the oscillatory device, and means for automatically stopping the oscillatory device before its reverse is accomplished.

9. A driven element, an oscillatory device for rotating the driven element, means for reversing the operative relation of the oscillatory device, a link, a connection from the link to the oscillatory device, a fulcrum for the link, means for varying the position relation between the fulcrum and said connection, and a single means for controlling the varying means and the reversing means.

10. A driven element, an oscillatory device for rotating the driven element, a brake, a link, a connection from the link to the oscillatory device, a fulcrum for the link, means for varying the position relation between the fulcrum and said connection, and a single means for controlling the varying means and brake.

11. A driven element, an oscillatory device for rotating the driven element, means for reversing the operative relation of the oscillatory device, a brake, a link, a fulcrum for the link, a connection from the link to the oscillatory device, means for varying the position relation between the fulcrum and said connection, and a single means for controlling the brake and reversing means.

12. A driven element, an oscillatory device for rotating the driven element, means for reversing the operative relation of the oscillatory device, a brake, a link, a fulcrum for the link, a connection from the link to the oscillatory device, means for varying the position relation between the fulcrum and said connection, and a single means for controlling the brake and reversing means and varying means.

13. A driven element, an oscillatory device for driving said element, a controller movable in either direction from a neutral position, means operated by the controller for regulating the throw of the oscillatory device and for reversing the operative relation of the oscillatory device when the controller is substantially at neutral position and for increasing the throw of the oscillatory device as the controller is moved in either direction away from its neutral position.

In testimony whereof I have hereunto set my hand, at Los Angeles, California, this 31st day of August, 1905.

GEORGE T. HACKLEY.

In presence of—
 F. M. TOWNSEND,
 VERNA A. TALBERT.